United States Patent Office 2,917,392
Patented Dec. 15, 1959

2,917,392

WAXES CONTAINING OXYGEN

Salomon Petrus Ligthelm and Caspar Wilhelmus Schutte, Sasolburg, Orange Free State, Union of South Africa, assignors to South African Coal, Oil and Gas Corporation Limited, Sasolburg, Orange Free State, Union of South Africa No Drawing. Original application March 23, 1955, Serial No. 496,336. Divided and this application September 18, 1956, Serial No. 610,657

Claims priority, application Union of South Africa March 27, 1954

14 Claims. (Cl. 106—10)

The present application for patent is a divisional application and relates to an invention divided out from our copending application for Letters Patent Serial Number 496,336, filed March 23, 1955, now abandoned.

The present invention relates to a process for the production of improved waxes containing oxygen by oxidation of high molecular weight hydrocarbons, to the waxes containing oxygen thus produced to improvements of the said improved waxes and polishes produced therewith.

A more specific object of the invention is the production of improved waxes containing oxygen that can be used in place of carnauba wax and also mixtures thereof with beeswax, e.g. in the manufacture of polishes or for other uses.

Several suggestions for carnauba wax substitutes for use in polishes can be found in the literature, e.g. the use of hydrogenated triglycerides, and the use of esters of high molecular weight acids and alcohols and the glycol esters of high molecular weight acids. Other formulations comprise the use of a mixture of polyethylene and a paraffin wax, the synthetic resins or the use of paraffin waxes having a mean molecular weight of over 800. Other hard wax compositions can be obtained by the ketonisation of high molecular weight acids or preparing the calcium salts of the higher organic acids e.g. calcium resinate. None of these are satisfactory in all respects.

In accordance with the present invention, improved waxes containing oxygen, which may be used in place of carnauba wax and also of mixtures thereof with beeswax are produced by a process comprising catalytically oxidizing a hard paraffin wax, having a mean molecular weight of at least 800, in a molten state with oxygen, or a gas containing free oxygen, e.g. air at an oxidizing temperature exceeding 130° but below 145° C. and for so short a time that the acid number of the product is substantial but below 40.

Acid number is the number of milligrams of potassium hydroxide required for neutralisation per gram of oxidized wax product.

In accordance with the invention, the reaction is stopped when the acid number is between 5 and 39. Samples are usually tested from time to time to ascertain when this is the case.

For oxidized waxes to be used in place of carnauba wax alone e.g. for emulsion or self-gloss type polishes oxidized waxes with lower acid numbers, e.g. in the range of 5 to 15 are preferred, whereas as substitutes for mixtures of carnauba and beeswax e.g. as used in paste emulsion polishes, oxidized waxes with higher acid numbers, e.g. at between above 15 and up to 39 are preferred.

The hard paraffin waxes taken as initial materials in accordance with the present invention preferably have a mean molecular weight between about 830 and 1100. The hard paraffin waxes to be subjected to oxidation should not, as a rule, contain substantial amounts of constituents having a molecular weight below 500.

The said hard paraffin waxes should have a softening point (ring and ball method—hereinafter referred to as "R. and B.") higher than 95° C., and preferably at least 100° C. Preferred initial hard waxes have a softening point of 105–107° C. (R. and B.).

The hard waxes to be oxidized in accordance with the present invention should be essentially straight chain aliphatic wax hydrocarbons and preferably free from or substantially free from olefines.

They are preferably derived from the Fischer-Tropsch synthesis, but natural or other hard waxes having the said molecular weights and similar characteristics may be employed as initial materials.

The hard paraffin waxes serving as the initial materials proper for the said oxidation may be prepared from paraffin waxes from the aforesaid sources by high vacuum distillation and/or crystallisation.

In case olefines have to be eliminated this may be done by hydrogenation prior to the oxidation.

A thorough distribution of the oxidizing gas in the material being oxidized is a factor in favour of obtaining good results.

Fatty acid salts of manganese, cobalt, copper and the like, or oxides and salts, such as potassium permanganate, manganese dioxide, iron oxide or silver oxide are examples of the catalysts that may be employed for the oxidation to yield oxidized waxes. The catalysts are preferably dissolved or suspended in a finely divided condition in the molten wax undergoing oxidation, depending on their solubility.

Waxes oxidized at higher temperatures or to acid numbers exceeding 40, are frequently soft and pasty owing, on the one hand, to side reactions which take place and, on the other hand, to the formation of a larger percentage of lower molecular weight decomposition products, than obtained in accordance with the invention.

The final oxidized wax, with an acid number below 40, is usually purified. To this end, it may be subjected to vacuum distillation at a temperature of say 150° C. and at a pressure of say 0.3 mm. to remove any residual low molecular weight hydrocarbons as well as low molecular weight fatty acids and esters and other low molecular weight substances which may have been formed during the oxidation.

The presence of such lower molecular weight material in the final product can reduce the hardness of the final products and the gloss of polishes made up therewith considerably.

In the aforesaid purification, the acid number of the oxidized wax is reduced somewhat. Thus the purification of a crude oxidized wax having an acid number of slightly below 40 will often lower the acid number by 1½–2 units, whereas the purification of a crude oxidized wax having an acid number in the region of 10 will often lower the acid number by about 0.4–0.6 unit.

The purified oxidized waxes should have a minimum softening point (R. and B.) of 99° C. The preferred range of softening points for the said products is 99°–110° C., preferably 100°–105° C.

We have further found that the hardness, the anti-slip properties and often the softening point of the waxes containing oxygen produced in accordance with the present invention are substantially improved by providing for the presence therein of certain fatty acid salts or mixtures thereof, in particular fatty acid salts of alkali metals and alkaline earth metals, and preferably both. The said fatty acid salts are those formed by interaction with the high molecular fatty acids contained in the oxidized wax and produced by the said oxidation e.g. by interaction of the carbonates, oxides or hydroxides of alkaline earth metals, e.g. calcium, strontium, barium or magnesium, or of aluminium, and with the carbonates of the alkali metals, e.g. sodium, potassium or lithium with said high molecular weight fatty acids, to yield final products with an acid number of about 3–10. Zinc or silver oxides, carbonates or hydroxides may be employed wholly or in part in place of the alkaline earth metal compounds. Chromium or iron can also be used in cases where the green or yellow colour is not objectionable or is desirable. The said salts are preferably incorporated into the purified oxidized wax.

We have further found that the gloss of the waxes containing oxygen produced in accordance with the present invention is substantially increased by providing therein mixtures of salts of the high molecular fatty acids contained in the oxidized wax, of monovalent and polyvalent metals. The monovalent metals taken, are, as a rule, the alkali metals hereinbefore referred to, whereas the polyvalent metals taken, are, as a rule, the alkaline earth metals, aluminium, zinc, chromium or iron.

Since the polyvalent metals form salts with a plurality of fatty acid radicals, their fatty acid salts have a much higher molecular weight than equivalent salts of monovalent metals.

The total amount by weight of alkali metals present is usually several times, preferably at least three times, the total amount by weight of polyvalent metals present.

Wax compositions in accordance with the present invention showing the said gloss advantageously comprise the following percentages by weight of metals in the form of salts of the high molecular fatty acids contained in the oxidation product and produced by the said oxidation:

TABLE 1

|           | Percent     |
|-----------|-------------|
| Sodium    | 0.1–1.2     |
| Potassium | 0.005–0.4   |
| Calcium   | 0.02–0.4    |
| Zinc      | 0.001–0.2   |

These wax compositions usually have softening points (B. and R.) in the range of 103°–122° C.

Usually smaller proportions of fatty acid salts are employed in oxidized waxes with lower acid numbers than those having higher acid numbers.

Thus with oxidized waxes having acid numbers in the range 5–15, the percentages by weight of metals in the form of salts of the said fatty acids are preferably

TABLE 2

|           | Percent      |
|-----------|--------------|
| Sodium    | 0.1–0.5      |
| Potassium | 0.005–0.02   |
| Calcium   | 0.02–0.1     |
| Zinc      | 0.001–0.05   |

These wax compositions usually have softening points (B. and R.) in the range of 103–110° C.

With oxidized waxes having acid numbers above 15 but below 40, the percentages of metals in the form of salts of the said fatty acids are preferably

TABLE 3

|           | Percent    |
|-----------|------------|
| Sodium    | 0.5–1.2    |
| Potassium | 0.02–0.4   |
| Calcium   | 0.1–0.4    |
| Zinc      | 0.05–0.2   |

These wax compositions usually have softening points (B. and R.) in the range above 110° and up to 122° C.

If the zinc is omitted, the proportion of calcium should be increased, and if the potassium is omitted, the proportion of the sodium and calcium together is increased. Thus a mixture comprising up to 1.2% sodium and up to 0.8% calcium in the form of hard fatty acid salts is very suitable. The calcium may also be replaced by magnesium or aluminium.

The order in which the salt forming constituents are added to the oxidized wax to form salts with the said high molecular acids contained therein and produced by the oxidation is of importance in order to complete the interaction. Preferably the less reactive constituents are added first and then the more reactive constituents. Thus it is advantageous first to react the alkaline earth or polyvalent metal compounds and then the alkali metal compounds, e.g. first the carbonates or the like of zinc and calcium are added and then those of sodium and potassium.

The aforedescribed addition of salts may prove generally useful for improving the qualities of other oxygen-containing waxes, e.g. in respect of gloss, hardness and solvent retention.

The final product may have a yellowish colour. It is extremely hard and brittle, but is nevertheless soluble in the usual wax solvents. It can be substituted for carnauba wax in polishes, e.g. emulsion type polish formulations and the usual mixtures of carnauba wax with beeswax in paste emulsion type polish formulations and other polishes. The hardness of the final product and the gloss of polishes made therewith equals the values obtainable with carnauba wax in these polishes.

The invention will be further described and ascertained in the following examples, but it should be understood that the invention is not limited to the said examples. The parts are by weight unless otherwise stated.

*Example 1.—Preparation of a wax for use in place of carnauba wax and beeswax*

Hard paraffin wax produced in a Fischer-Tropsch process and having a mean molecular weight of about 600, and a melting point of 90–95° C., is distilled under vacuum (0.3 mm.) in a flash distillation until the temperature of the column reaches 290–310° C. The pot residue which has a mean molecular weight of 870 and a softening point (R. and B.) of 105–107° C., is cooled to 140° C. and poured into a cylindrical flask, 5.5 cm. in diameter and 50 cm. long, having a sintered glass disc, porosity grade 3 as a bottom. Manganese stearate in an amount of 0.1 percent of the weight of the wax, is added and air is passed through the wax at a rate of 2 millilitres calculated to normal conditions of temperature and pressure, per minute per gram of wax. The wax is oxidized at at least 140 but below 145° C. until the acid number and saponification number reach 38 and 72 respectively, which in this case takes 4–5 hours. Vacuum is then applied to the apparatus and the lower molecular weight fatty acids, esters, residual low molecular weight hydrocarbons and other lower molecular weight substances that may have been formed are thus distilled off. The final product has an acid number and saponification number of 36 and 68 respectively.

The reaction flask is now provided with a stirrer and for every 100 parts of oxidized paraffin wax there are now added at 130° C.–170° C., say 150° C., salt forming ingredients in the following order: 0.75 part of calcium carbonate and 0.2 part of zinc carbonate followed by 1.3 parts of sodium carbonate and 0.5 part of potassium carbonate. After the reaction has subsided, the mixture is allowed to stand for an hour and the clear wax is decanted off. The mixture can also be clarified by passing through a hot filter press. The fatty acid salts thus formed harden the wax considerably.

*Example 2.—Substitution of carnauba wax and beeswax in wax formulations*

(i) Paste-emulsion polishes were prepared with the following ingredients for purposes of comparing the properties of wax formulations in accordance with the invention with those prepared from carnauba wax and beeswax:

|  | Formula 1 (Carnauba Wax and Bees Wax) | Formula 2 (Oxidized Wax in accordance with the invention) |
|---|---|---|
|  | Percent | Percent |
| Carnauba Wax | 16 |  |
| Wax containing salts in accordance with Example 1 |  | 20 |
| Bees Wax | 16 |  |
| Paraffin Wax, softening point 64° C. (R. and B.) | 68 | 64 |
| Paraffin Wax, softening point 100° C. (R. and B.) |  | 16 |

Formula 1 has a 60°-gloss of 88 and 63, measured with a Hunter gloss meter, while Formula 2 has a 60°-gloss of 85 and 69. The gloss values are determined as follows in accordance with S.A.B.S., 13/1951, pages 11 to 13:

"5.10 GLOSS VALUE

"5.10.1 Apparatus

"5.10.1.1 *Brass plate with hole.*—A brass plate 4 x 4 x ⅛ in. thick with a shouldered hole 2 in. in diameter in the centre of the plate, resting on an ⅛ in. thick brass plate and which can be clamped in a suitable clamping device.

"5.10.1.2 *Polishing table.*—A smooth level, horizontal metal polishing table having a recess 4 x 4 x ¼ in. deep to hold the brass plate.

"5.10.1.3 *Polishing head.*—A round polishing head 4 in. in diameter, weighing 1 lb. and consisting of a metal disc 4 in. in diameter, to which is fixed a wooden disc 4 in. in diameter and of uniform thickness.

"5.10.1.4 *Reflectometer.*—A Hunter multipurpose reflectometer and a black calibrated glass mirror of 95 percent gloss (R.S. Hunter), 'A multipurpose photoelectric reflectometer,' J. Research N.B.S. 25, 581 (1940 R.P.).

"5.10.2 Procedure

"5.10.2.1 *Preparation of sample.*—Weigh out four portions of the paste polish, weighing about 20 g. each or four portions of the liquid polish weighing about 50 g. each in shallow porcelain dishes. While constantly stirring with a thermometer and taking care that the temperature does not rise above 160° C., drive off the volatile matter on a hot plate. When most of the volatiles have been driven off (i.e., after about 15 minutes) transfer the dishes to an oven maintained at a temperature of 110 to 120° C. and condition the samples for 10 to 12 hours stirring thoroughly from time to time, to facilitate evaporation. Add the contents of the four dishes together, stir thoroughly and pour into the brass plate with the shouldered hole, avoiding the incorporation of air bubbles in the mass. Before commencing moulding, clamp the plate to prevent the wax cake from warping on being cooled to room temperature. After cooling to room temperature (about 25° C.), scrape off the excess material cleanly with a smooth level scraper (carpenter's type) until the wax surface is level with the brass surface. Wipe the wax surface carefully with a clean piece of chamois to remove all scars left by the scraper.

"5.10.2.2 *Development of gloss.*—Keep the wax cake, prepared in accordance with 5.10.2.1 in the brass plate at a temperature of 30±0.5° C. and a relative humidity of 45 to 55 percent for 24 hours, and maintain thus throughout the following steps:

"Place the wax cake sample in the brass plate in the square recess of the polishing table so that the surfaces of the wax cake, brass plate and table are level.

"Cover the polishing head with ¼" woolen felt and cover the latter with washed, smoothed, bleached, mercerised cotton lawn. Take care to eliminate all wrinkles from the surface.

"Move the head 100 times (200 strokes) over the wax cake surface over a distance of 8 in. and at a rate of 57 times (114 strokes) per minute. Apply the first 200 strokes over the surface under a pressure of 4 lb. (i.e. the total weight of the polishing head is 4 lb.). After the first 200 strokes apply a second cycle of 200 strokes under a pressure of 1 lb. using the same cloth as in the first cycle. Maintain the wax cake, brass plates and polishing head at a temperature of 30±0.5° C. and a relative humidity of 45 to 55 percent.

"5.10.2.3 *Measurement of gloss.*—After the wax cake has been buffed in accordance with 5.10.2.2, indicate the direction in which the polishing head traveled over the surface by an arrow (→) on the brass plate. Make all measurements on the sample parallel to the arrow and report it as gloss percent (→)/30° C., taking the standard black glass mirror as 95 percent gloss.

"Measure the gloss on the Hunter multipurpose reflectometer at a 60 degree angle of light incidence, using the black calibrated glass mirror of 95 percent gloss, a green filter and the small aperture."

(*ii*) Advantageous wax formulations for polishes, in particular paste emulsion polishes comprise:

| | Percent |
|---|---|
| Oxidized waxes produced in accordance with the invention having acid numbers between 15 and 40 and salts in accordance with Table 3 incorporated therein | 18–25 |
| Paraffin wax-softening point (R. and B.) 60°–70° C. | 55–65 |
| Super hard paraffin wax-softening point (R. and B.) 100°–105° C. | 10–27 |

(*iii*) A paste emulsion polish was prepared from the wax mixtures, using Formulae 1 and 2.

The wax emulsion consisted of the following:

25% of the respective formulae above-mentioned
39% white spirits
35% water
1% potassium carbonate The two wax emulsions had the same consistency. That obtained with Formula 1 had a 60° gloss of 80 and 71, while that with Formula 2 had a gloss of 88 and 69.

(*iv*) Paste emulsion polishes in accordance with the invention are advantageously made up in the following proportions:

22.5–27.5% wax formulation in accordance with Example 2(*ii*).
35–45% turpentine, white spirits (if desired, in part replaced by household paraffin).
42–26% water.
0.5–1.5% potassium carbonate or other suitable alkali.

*Example 3*

A wax oxidized in accordance with Example 1 and having a melting point of 102° C. was treated to yield a wax containing 1.2% sodium, 0.1% potassium, 0.4% calcium and 0.08% zinc in the form of salts of fatty acids of the oxidized wax.

The product thus obtained has a softening point (R. and B.) of 122° C.

*Example 4*

The pot residue obtained by distillation as described in Example 1 which has a mean molecular weight of 840 and a softening point (R. and B.) of 103–105° C. is cooled to 140° C. and poured into a cylindrical flask, 5.5 cm. in diameter and 50 cm. long with a sintered glass disc porosity grade 3, as bottom. Manganese stearate in an amount of 0.1 percent, of the weight of the wax, is added and air is passed through the wax at a rate of 2 millilitres calculated at normal conditions of temperature and pressure per minute, per gram of wax. The wax is oxidized at above 140° but below 145° C. until the acid number and saponification number reaches 6 and 12, respectively. This takes 1–2 hours.

Vacuum is then applied to the apparatus and the lower molecular weight fatty acids, esters and any residual low molecular weight hydrocarbons removed. The final product has an acid number of 5.6, a saponification number of 11 and softening point of 100–102. The reaction flask is now provided with a stirrer and for every 100 parts of oxidized wax there are now added at 130–170° C., say 150° C. salt forming ingredients in the following order:

0.07 gm. calcium oxide
0.015 gm. ZnO, followed by
0.22 gm. sodium carbonate, and
0.01 gm. potassium carbonate After the reaction has subsided the mixture is allowed to stand for an hour and the clear wax is decanted off. The product thus obtained had a softening point of 103–105° C.

PART SUBSTITUTION OF CARNAUBA WAX IN SELF-GLOSS POLISHES

Two emulsion polishes were made with the following ingredients:

|  | Form A | Form B |
|---|---|---|
| Paraffin Wax 145° F | 8 | 8 |
| Oleic Acid | 8 | 8 |
| Morpholine | 10 | 10 |
| Borax (50:50 water) | 4 | 4 |
| Carnauba Wax | 50 | 30 |
| Wax Sample 4 in accordance with the invention |  | 20 |
| Water | 500 | 500 |

The gloss of the polish form B was at least as good as that for form A and was excellent after some buffing.

In the production of self-gloss polishes, 30 to 50 percent of the carnauba wax content or even its entire content may be substituted by the wax in accordance with the invention.

What we claim is:

1. A process for the production of hardened oxidized waxes which may be used in place of carnauba wax and also a mixture thereof with beeswax, which consists essentially in catalytically oxidizing a hard paraffin wax, having a mean molecular weight of at least 800, in a molten state with a gas comprising free oxygen at a temperature exceeding 130° but below 145° C., stopping the oxidation when the product has an acid number between 5 and 39, and hardening the oxidized wax by producing therein salts of the high molecular weight fatty acids formed by said oxidation by causing said fatty acids to interact both with at least one compound, capable of forming the said salts with the said fatty acids, of a metal selected from the group consisting of the alkali metals sodium, potassium and lithium and with at least one compound, capable of forming the said salts with the said fatty acids, of a metal selected from the group consisting of the polyvalent metals aluminium, zinc, chromium, iron and the alkaline earth metals.

2. A process as claimed in claim 1, which consists essentially in first incorporating with the oxidized wax the salt forming compound of the polyvalent metal and then the salt forming compound of the alkali metal.

3. A process as claimed in claim 1, which consists essentially in first incorporating with the oxidized wax carbonates of zinc and calcium and then those of sodium and potassium.

4. A process as claimed in claim 1, which consists essentially in first incorporating with the oxidized wax 0.75 part of calcium carbonate and 0.2 part of zinc carbonate and then 1.3 parts of sodium carbonate and 0.5 part of potassium carbonate per 100 parts of oxidized wax.

5. A process for the production of hardened oxidized waxes which may be used in place of carnauba wax and also of mixtures thereof with beeswax, which consists essentially in catalytically oxidizing a hard paraffin wax, having a mean molecular weight of at least 800, in a molten state with a gas comprising free oxygen at a temperature exceeding 130° but below 145° C., stopping the oxidation when the product has an acid number between 5 and 39, and hardening the oxidized wax by producing therein salts of the high molecular weight fatty acids formed by said oxidation by causing said fatty acids to interact with both a compound of an alkali metal and at least one compound of the polyvalent metals aluminium, zinc, chromium, iron and the alkaline earth metals, said compounds being capable of forming the said salts with the said fatty acids, and being in proportions to yield mixtures of salts containing at least 3 parts of alkali metal to 1 part of polyvalent metal combined as salts.

6. A hardened oxidized wax which may be used in place of carnauba wax and of mixtures thereof with beeswax, and which has been obtained by catalytically oxidizing a hard paraffin wax having a mean molecular weight of at least 800, in a molten state with a gas comprising oxygen at a temperature exceeding 130° but below 145° C. for so short a time that the acid number is between 5 and 39, and containing the following percentages by weight of metals in the form of salts of high molecular weight fatty acids produced in the said oxidation:

| | Percent |
|---|---|
| Sodium | 0.1–1.2 |
| Potassium | 0.005–0.4 |
| Calcium | 0.02–0.4 |
| Zinc | 0.001–0.2 | the said salts having been produced by the interaction with the said acids of compounds of the said metals capable of such interaction incorporated into the oxidized wax.

7. A hardened oxidized wax as claimed in claim 6, having a softening point (R. and B.) in the range above 110° C. and up to 122° C.

8. A hardened oxidized wax as claimed in claim 6 in which up to 1.2% sodium and up to 0.8% calcium in the form of hard fatty acid salts are provided in the oxidized waxes while omitting zinc, the said salts having been produced by incorporating into the oxidized wax the requisite amounts of compounds of sodium and calcium capable of forming fatty acid salts and causing them to interact with the high molecular weight fatty acids formed by the oxidation.

9. A hardened oxidized wax which may be used in place of carnauba wax and of mixtures thereof with beeswax, and which has been obtained by catalytically oxidizing a hard paraffin wax having a mean molecular weight of at least 800, in a molten state with a gas comprising oxygen at a temperature exceeding 130° but below 145° C. for so short a time that the acid number is between 5 and 15, and containing the following percentages by weight of metals in the form of salts of high molecular weight fatty acids produced in the said oxidation:

| | Percent |
|---|---|
| Sodium | 0.1–0.5 |
| Potassium | 0.005–0.02 |
| Calcium | 0.02–0.1 |
| Zinc | 0.001–0.05 | the said salts having been produced by the interaction with the said acids of compounds of the said metals capable of such interaction incorporated into the oxidized wax.

10. A hardened oxidized wax which may be used in place of carnauba wax and of mixtures thereof with beeswax and which has been obtained by catalytically oxidizing a hard paraffin wax having a mean molecular weight of at least 800, in a molten state with a gas comprising oxygen at a temperature exceeding 130° but below 145° C. for so short a time that the acid number is between 15 and 40, and containing the following percentages by weight of metals in the form of salts of high molecular weight fatty acids produced in the said oxidation:

|  | Percent |
|---|---|
| Sodium | 0.5–1.2 |
| Potassium | 0.02–0.4 |
| Calcium | 0.1–0.4 |
| Zinc | 0.05–0.2 | the said salts having been produced by the interaction with the said acids of compounds of the said metals capable of such interaction incorporated into the oxidized wax.

11. A paste emulsion polish which contains 22.5–27.5% of the following wax formulation (a), (b) and (c).

(a) a wax obtained by catalytically oxidizing a hard paraffin wax having a mean molecular weight of at least 800, in a molten state with a gas comprising oxygen at a temperature exceeding 130° but below 145° C. for so short a time that the acid number is at least 15 but below 40 and which contains the following percentages by weight of metals in the form of salts of high molecular weight fatty acids produced in the said oxidation:

|  | Percent |  |
|---|---|---|
| Sodium | 0.5–1.2 | |
| Potassium | 0.02–0.4 | 18–25 |
| Calcium | 0.1–0.4 | |
| Zinc | 0.05–0.2 | | the said salts having been produced by the interaction with the said acids of compounds of the said metals capable of such interaction incorporated into the oxidized wax.

(b) paraffin wax-softening point (R. and B.) 60°–70° C. ............ 55–65

(c) super hard wax-softening point (R. and B.) 100°–105° C. ............ 27–10 emulsified with 35–45% of an organic solvent selected from the group consisting of turpentine, white spirits and household paraffin, 42–26% of water, and 0.5–1.5% of an alkali metal carbonate.

12. A process for the production of hardened oxidized waxes which may be used in place of carnauba wax and also of mixtures thereof with beeswax, which consists essentially in catalytically oxidizing a hard paraffin wax, produced in a Fischer-Tropsch synthesis and having a mean molecular weight of at least 800, in a molten state with a gas comprising free oxygen at a temperature exceeding 130° but below 145° C., stopping the oxidation when the product has an acid number between 5 and 39, and hardening the oxidized wax by producing therein salts of the high molecular weight fatty acids formed by said oxidation by causing said fatty acids to interact both with at least one compound, capable of forming the said salts with the said fatty acids, of a metal selected from the group consisting of the alkali metals sodium, potassium, and lithium and with at least one compound, capable of forming the said salts with the said fatty acids, of a metal selected from the group consisting of the polyvalent metals aluminium, zinc, chromium, iron and the alkaline earth metals.

13. A process for the production of hardened oxidized waxes which may be used in place of carnauba wax and also of mixtures thereof with beeswax, which consists essentially in catalytically oxidizing a hard paraffin wax, having a mean molecular weight of at least 800, in a molten state with a gas comprising free oxygen at a temperature exceeding 130° but below 145° C., stopping the oxidation when the product has an acid number between 5 and 39, subjecting the oxidized wax to vacuum distillation to remove any residual low molecular weight hydrocarbons, as well as low molecular weight fatty acids and esters and other low molecular weight substances which may have been formed during the oxidation, and hardening the oxidized wax by producing therein salts of the high molecular weight fatty acids formed by said oxidation by causing said fatty acids to interact both with at least one compound, capable of forming the said salts with the said fatty acids, of a metal selected from the group consisting of the alkali metals sodium, potassium, and lithium and with at least one compound, capable of forming the said salts with the said fatty acids, of a metal selected from the group consisting of the polyvalent metals aluminium, zinc, chromium, iron and the alkaline earth metals, incorporated with the oxidized wax.

14. A process for the production of hardened oxidized waxes which may be used in place of carnauba wax and also of mixtures thereof with beeswax, which consists essentially in catalytically oxidizing a hard paraffin wax, produced in a Fischer-Tropsch synthesis and having a mean molecular weight of at least 800, in a molten state with a gas comprising free oxygen at a temperature exceeding 130° but below 145° C., stopping the oxidation when the product has an acid number between 5 and 39, subjecting the oxidized wax to vacuum distillation to remove any residual low molecular weight hydrocarbons as well as low molecular weight fatty acids and esters and other low molecular weight substances which may have been formed during the oxidation, and hardening the oxidized wax by incorporating therewith compounds both of monovalent and polyvalent metals capable of forming fatty acid salts into the thus treated wax and producing therein salts of the said metals with the high molecular fatty acids produced in the wax by the said oxidation.

References Cited in the file of this patent

UNITED STATES PATENTS

| 2,010,297 | Flaxman | Aug. 6, 1935 |
| 2,249,708 | Hicks-Bruun | July 15, 1941 |
| 2,733,154 | Taylor | Jan. 31, 1956 |
| 2,798,841 | Fish | July 9, 1957 |
| 2,821,484 | Kolling et al. | Jan. 28, 1958 |